United States Patent [19]
Bloch et al.

[11] Patent Number: 6,058,440
[45] Date of Patent: May 2, 2000

[54] PROGRAMMABLE AND ADAPTIVE RESOURCE ALLOCATION DEVICE AND RESOURCE USE RECORDER

[75] Inventors: Peter Bloch; Leonard W. Cross, both of Portland; Ali S. Oztaskin, Beaverton, all of Oreg.

[73] Assignee: Intel Corporation, Santa Clara, Calif.

[21] Appl. No.: 08/926,314

[22] Filed: Sep. 5, 1997

[51] Int. Cl.[7] .................................................. G06F 13/42
[52] U.S. Cl. .............................. 710/60; 710/29; 710/105
[58] Field of Search ................................... 710/104, 105, 710/106, 107, 110, 112, 129, 117, 29, 60

[56] References Cited

U.S. PATENT DOCUMENTS

| | | | |
|---|---|---|---|
| 4,719,620 | 1/1988 | Machino et al. | 370/445 |
| 5,235,592 | 8/1993 | Chang et al. | 370/451 |
| 5,778,218 | 7/1998 | Gulick | 713/503 |
| 5,818,948 | 10/1998 | Gulick | 381/77 |
| 5,832,492 | 11/1998 | Wooten | 707/101 |
| 5,859,993 | 1/1999 | Snyder | 711/144 |
| 5,884,086 | 3/1999 | Amoni et al. | 713/300 |

*Primary Examiner*—Xuan M. Thai
*Attorney, Agent, or Firm*—Kenyon & Kenyon

[57] ABSTRACT

A method and device is provided for controlling access to a resource by a bus master over a bus coupling the bus master to the resource. The resource includes an intelligent component that controls the operation of the resource. A series of packets is transmitted over the bus between the bus master and the resource, at a transmission speed controlled by the bus master. A request/response logic in the resource controllably throttles transmissions of the packets at the resource, at specified time intervals. Each of the time intervals is set at a time period to assure sufficient time for the intelligent component to complete processing tasks contained in the packets.

12 Claims, 2 Drawing Sheets

PROGRAMMABLE AND ADAPTIVE RESOURCE ALLOCATION DEVICE AND RESOURCE USE RECORDER

FIELD OF THE INVENTION

The present invention is directed to resource allocation in a computer system. More particularly, the present invention provides a mechanism to permit an intelligent component onboard a resource, such as a peripheral device, to control access to the resource when a high performance bus master transmits requests to the resource.

BACKGROUND OF THE INVENTION

Computer systems typically comprise components that can be characterized as clients and resources. A client can be, e.g., a host computer that uses the resources for certain functions such as communications and the storage of data. A bus comprises one or more wires that electrically couple the clients and resources of the computer system to one another. Computer systems implement bus protocols to facilitate and control communications between the various components of the system over the bus. The bus protocol defines the physical characteristics of the bus, bus transactions, phase specifications and control and handshake signals that permit the transmission of data and control information between the clients and resources.

Various industry standard bus protocols have been designed to enable users to assemble computer systems comprising components that, although made by different manufacturers, are consistent with one another in terms of physical and logical compatibility according to an industry standard bus protocol. One example of an industry standard bus protocol is the Universal Serial Bus Specification (USB protocol) jointly developed by a consortium of companies including the Intel Corporation, IBM PC Company, Microsoft Corporation and NEC and others. The 1.0 Final Draft Revision of the USB protocol dated Nov. 13, 1995 is hereby expressly incorporated by reference.

The USB protocol provides a fast, low cost, bi-directional, peripheral serial interface bus that can be implemented in an input/output port (I/O port) of a host computer such as a personal computer (PC). The USB protocol supports "plug and play" functionality so that a wide variety of different types of resources can be coupled to I/O ports of the host computer implementing the USB protocol, and be available for use as a resource by the host computer. Thus, resources including peripheral devices such as telephone/fax/modem adapters, video scanners, keyboards, mice and so on, can be plugged into a serial port of the host computer and be usable by the host computer upon plug-in.

One aspect of the USB protocol that enables the plug and play versatility is an identification negotiation. In an identification negotiation, a serial port controller of the host computer performs a control bus transaction according to the USB protocol, over the bus, with a peripheral device, upon plug-in, to determine the configuration and operating state characteristics of the peripheral device. The information acquired by the host computer by way of the identification negotiation enables the host computer to utilize the resource.

Pursuant to the USB protocol, the host computer acts as a master of the bus, and therefore controls bus transactions. The bus transactions can include requests related to the identification negotiation or other functions to be performed by the resource for the master. However, in many peripheral devices, the intelligent component of the device, e.g. an on-board processor controlling operation of the peripheral device, comprises an inexpensive component that cannot match the speed of operation of the host computer. For example, the on-board intelligent component may not be able to complete tasks associated with an identification negotiation or other requests by the computer, in real time, relative to the host computer. Other functions implemented in hardware on the peripheral device may also comprise inexpensive components unable to match the speed of operation of the host computer.

Thus, the on-board intelligent component and other hardware functions may not be able to effectively participate in the identification negotiation or other request tasks required by the host computer when the host computer is acting as a bus master. However, the use of more expensive, high performance on-board hardware components, to enable the device to keep pace with the host computer, may impact the commercial viability of the peripheral device.

Accordingly, there is a need for a programmable and adaptive resource allocation device and resource use recorder to enable a less expensive, lower performing intelligent components to allocate resources to a host computer when the host computer is acting as a bus master, in a manner that permits the intelligent component to perform an identification negotiation or other control transaction tasks for a higher performance host computer. This will permit a low cost intelligent component to achieve, e.g., plug and play compatibility with a host computer pursuant to a high performance protocol such as the USB protocol.

SUMMARY OF THE INVENTION

The present invention provides a resource allocation scheme that permits an intelligent component of a resource such as a peripheral device, to throttle incoming requests from a component controlling the bus, such as a host computer, at specified controlled time intervals, to assure sufficient time for the intelligent component to complete processing tasks associated with the requests. The present invention also provides, in an exemplary embodiment, a resource use recorder to track the order of requests transmitted by a port controller of the host computer over the bus. In this manner, throttled requests can be arranged in a proper order for coherent processing via a correct sequence of availability of the resources.

In an exemplary embodiment of the invention, the throttling of requests is achieved by making a resource unavailable to a requesting component that controls the bus, such as the host computer, after transmission over the bus of a first information packet related to a bus transaction. The resource may be made available again once a controlled time interval has elapsed. The controlled time interval provides sufficient time for the intelligent component of the peripheral device to arrange an appropriate response to the task defined by the transmitted packet. Moreover, a record of the first packet can be recorded at the peripheral device upon transmission. The record may be in the form of a status record showing the type of transmission and the acknowledgment of its proper reception. A second packet related to the bus transaction is received once the resource is available again. Upon the receipt of the second packet, the resource may again be made unavailable to the requesting component. The toggling of the resource between states of availability and unavailability is continued during successive time intervals until all packets related to the bus transaction have been transmitted across the bus, and corresponding status information has been recorded at the peripheral device. Packet status may also be recorded according to a priority scheme where tasks associated with certain packets are recorded for performance before other tasks.

According to another feature of the present invention, a START OF FRAME (SOF) packet is utilized as a mechanism to provide the controlled time intervals for reinstatement of the availability of a resource. Some systems, including the USB protocol, divide system operations into distinct time frames. An SOF packet is transmitted at the beginning of each time period and, according to a feature of the present invention, is used as a signal to initiate a change in functional modes, such as the transition of a resource from an unavailable state to an available state. The SOF packet time is an appropriate time for a mode change since it inherently occurs between system cycles. Thus, a change in the availability of a resource never occurs mid-stream in an active system cycle, which can cause erratic behavior by the computer system.

DETAILED DESCRIPTION

Figure 1:
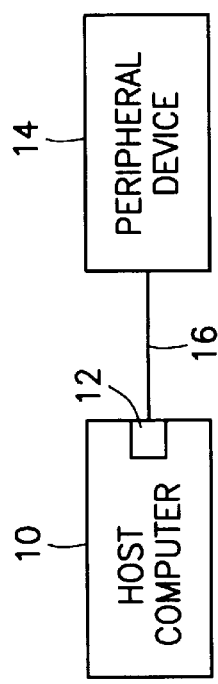
FIG. 1 is a block diagram of a host computer having an I/O port coupled to a peripheral device.

Referring now to the drawings, and initially to FIG. 1, there is illustrated a block diagram of a host computer 10 having an I/O port 12 coupled to a peripheral device 14. A bus 16 couples the peripheral device 14 to the computer I/O port 12, and is operated according to a bus protocol such as the USB serial bus protocol. The USB protocol provides for bus transactions comprising a SETUP phase, a DATA phase and a STATUS handshake phase. During each phase, a packet or packets having a defined format, are transmitted over the bus, and all bus transactions are controlled by the host computer 10.

The SETUP phase comprises a packet transmitted by the host computer 10 over the bus 16 and contains information regarding the type of transaction, and the direction of data transfers related to the transaction. The direction of data flow is specified in relation to the I/O port 12 of the host computer 10. An IN transfer refers to data transmitted into the I/O port 12 of the host computer 10, from the peripheral device 14. An OUT transfer refers to data transmitted out of the I/O port 12 of the host computer 10, to the peripheral device 14. The SETUP phase also specifies an address and device endpoint destination for the transaction. According to the USB protocol, the device endpoint is a uniquely identifiable portion of the peripheral device 14 that is to be the source or destination of the data transferred during the bus transaction.

The DATA phase comprises a packet containing the data relevant to the bus transaction. The STATUS phase comprises a handshake packet transmitted by the receiver of the data packet, to indicate the status of the transmission. For example, relevant to the exemplary embodiment of the present invention, handshake packets can contain either an ACK or NAK message. An ACK is an acknowledgment by the receiver that the data packet was received without data errors or other fault conditions being present. A NAK is negative acknowledgment available to the peripheral device 14 to indicate that the selected endpoint of the device was unable to accept the data packet from the host computer 10 (an OUT transmission) or that there is no data to be transmitted to the host computer 10 (an IN transmission).

NAK is used for flow control purposes to indicate that the endpoint of the peripheral device 14 is temporarily unable to transmit or receive data, but will be able to transmit or receive, as the case may be, in due time, without the need of host intervention. The host computer 10 continues to repeatedly transmit the packet that causes the NAK transmission until an ACK is transmitted by the peripheral device 14.

Figure 2:
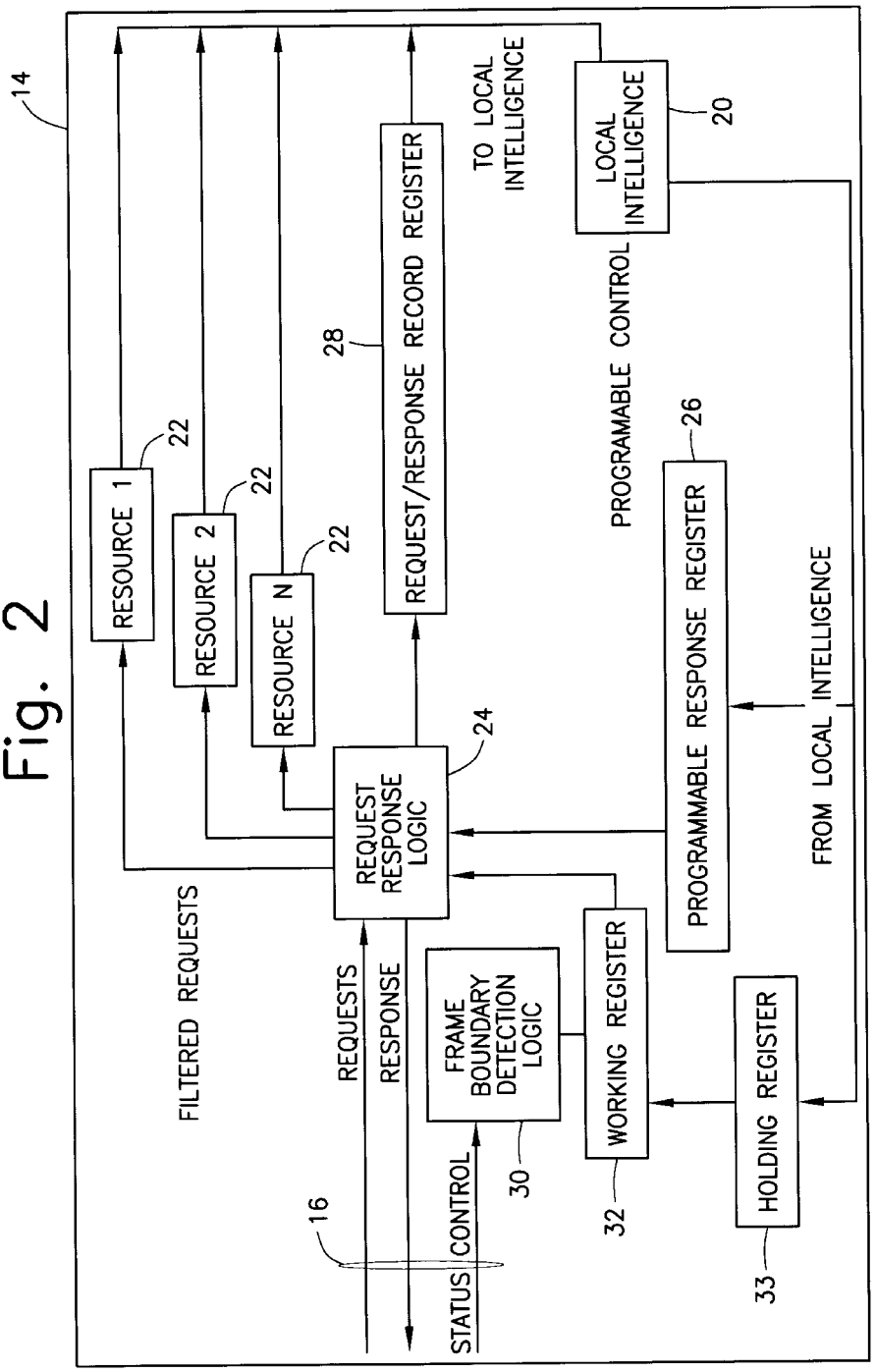
FIG. 2 is a block diagram of an exemplary request throttling mechanism in the peripheral device of FIG. 1, according to the present invention.

Referring now to FIG. 2, there is illustrated an exemplary request throttling mechanism within the peripheral device 14, according to the present invention. The request throttling mechanism utilizes NAK handshake packets to throttle packets related to requests so that a local intelligent device 20, on-board the peripheral device 14, may require re-transmissions of packets over the bus 16 to provide sufficient time for the local intelligent device 20 to complete tasks associated with requests. As shown in FIG. 2, resources 22, labeled RESOURCE 1, RESOURCE 2 to RESOURCE N in FIG. 2, represent endpoint functions within the peripheral device 14 that are available as resources to the host computer 10. In the exemplary embodiment of the present invention, the resources 22 comprise FIFO buffers for queuing incoming requests or outgoing responses, i.e. data packets and handshake packets, relating to the endpoint functions of the peripheral device 14.

A REQUEST/RESPONSE logic 24 is coupled to the bus 16, represented by REQUEST and RESPONSE lines and a STATUS and CONTROL line shown in FIG. 2, and to each of the resources 22. The REQUEST/RESPONSE logic 24 receives packets from the host computer 10, via the REQUEST line of the bus 16. The REQUEST/RESPONSE logic 24 decodes the endpoint destination for a bus transaction, as specified in the SETUP packet of the transmission, and routes the packets of the bus transaction to or from the selected resource 22. The REQUEST/RESPONSE logic 24 transmits responses generated by the resources 22, over the RESPONSE line, to the host computer 10. The REQUEST/RESPONSE logic 24 is also coupled to a PROGRAMMABLE RESPONSE register 26 that is written to by the local intelligent device 20 and read by the REQUEST/RESPONSE logic 24, and to a REQUEST/RESPONSE RECORD register 28.

The local intelligent device 20 transmits control signals to the REQUEST/RESPONSE logic 24, e.g. by writing control words into the PROGRAMMABLE RESPONSE register 26, to selectively control throttling of requests. In this manner, the throttling of requests is programmable by the intelligent device 20. For example, the control word can indicate to the REQUEST/RESPONSE logic 24 that RESOURCE 1 is to be made unavailable to IN or OUT transactions upon receipt of a SETUP packet. Thus, if the next packet is a SETUP packet, the REQUEST/RESPONSE logic 24 acknowledges the SETUP packet (ACK), however, the resource 22 (RESOURCE 1) is disarmed relative to any further IN or OUT transmissions relating to RESOURCE 1. The REQUEST/RESPONSE logic 24 is responsive to the disarm control word written into the PROGRAMMABLE RESPONSE register 26, to cause the status of the received and acknowledged SETUP packet and an identification of the selected resource 22 (RESOURCE 1 in this example) to be written into the REQUEST/RESPONSE RECORD register 28, to inhibit further transmissions to RESOURCE 1, and to transmit a NAK handshake packet over the RESPONSE line of the bus 16 in response to each subsequent IN or OUT transaction for RESOURCE 1, until a time when RESOURCE 1 is to be made available again, or a subsequent SETUP packet.

To that end, as shown in FIG. 2, the bus 16 also includes a STATUS AND CONTROL line. The USB protocol is a time frame based protocol and transmits a START OF FRAME (SOF) packet at the beginning of each time frame. A FRAME BOUNDARY DETECTION logic 30 is coupled to the STATUS and CONTROL line of the bus 16 and operates to detect each SOF packet. Upon detection of an SOF packet, the FRAME BOUNDARY DETECTION logic 30 enables a WORKING register 32. The WORKING register 32 is coupled to a HOLDING register 33, that is, in turn, coupled to the local intelligent device 20. In this manner, the local intelligent device 20 may transfer control words to the WORKING register 32 by writing to the HOLDING register 33. The contents of the HOLDING register 33 are transferred to the WORKING register 32 immediately after detection of an SOF.

As shown in FIG. 2, the WORKING register 32 is coupled to the REQUEST/RESPONSE logic 24, which, according to a feature of the present invention, polls the WORKING register 32 for a control word upon indication of an SOF. If the control word in the WORKING register 32 indicates that the resource is to be made available, the REQUEST/RESPONSE logic 24 makes the resource 22 (RESOURCE 1 in the present example) available by responding with an ACK packet upon a next transmission after the detected SOF, for RESOURCE 1 (assuming that the packet is properly received), and rearming the resource. The control word may indicate rearm upon an IN or OUT transaction after an SOF, then disarm the resource upon subsequent IN or OUT transactions until a reading of the WORKING register 32 at the next SOF.

In the event the control word indicates rearm at SOF, and disarm at subsequent IN or OUT transactions until the next reading of the WORKING register 32 (at the next SOF) or a next SETUP packet, it will cause the REQUEST/RESPONSE logic 24 to once again make the resource 22 (RESOURCE 1) unavailable by NAKing further OUT and IN transactions until a next detection of an SOF packet. The REQUEST/RESPONSE logic 24 also writes the status of the current acknowledged packet into the REQUEST/RESPONSE RECORD register 28, disarms the resource, inhibits further transmissions to RESOURCE 1, and transmits a NAK handshake packet over the RESPONSE line of the bus 16 whenever a transmission is to be completed for RESOURCE 1, until an indication of the next SOF packet. At the next SOF, the WORKING register 32 is once again enabled by the FRAME BOUNDARY DETECTION logic 30 and read by the REQUEST/RESPONSE logic 24.

Thus, control words can be generated by the local intelligent device 20 to cause the REQUEST/RESPONSE logic 24 to toggle the availability of selected ones of the resources 22, and record a status of each packet acknowledged at the completion of the transaction, for each selected resource 22. The toggling of requests provides additional time for tasks associated with bus transactions to be completed by the local intelligent device 20. The REQUEST/RESPONSE RECORD register 28 is coupled to the local intelligent device 20 for access to the recorded packet status. The additional time and ordered recording of packet status enables a relatively low performance local intelligent device 20 to properly respond to requests by the host computer 20, including identification negotiations according to the USB protocol.

Figure 3A:
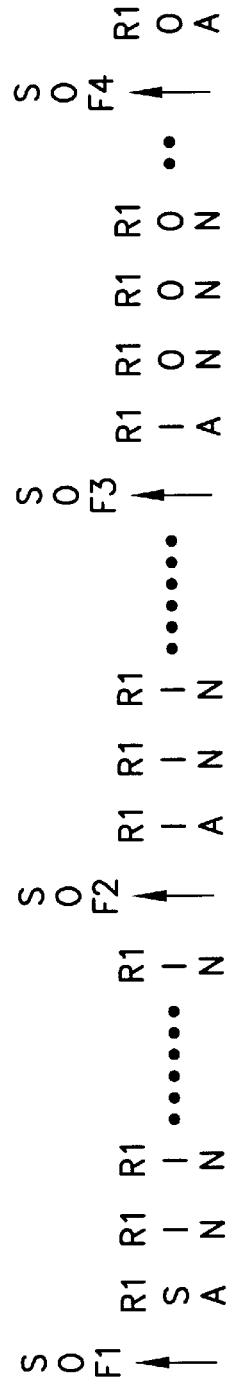
FIGS. 3a and 3b are timing diagrams illustrating an example of the flow of requests through the throttling mechanism of FIG. 2.
Figure 3B:

FIGS. 3a and 3b provide timing diagrams illustrating an example of the flow of requests through the throttling mechanism of FIG. 2. FIG. 3a represents packets transmitted over the bus 16 and FIG. 3b represents packet status stored in the REQUEST/RESPONSE RECORD register 28. In each of FIGS. 3a and 3b, SOF represents a start of frame packet, S represents a SETUP packet, I represents an IN packet transmission, O, an OUT packet transmission, R#, a specific resource 22, A, an ACK packet, and N, a NAK packet. The time line of FIG. 3a shows all packet transmissions over the bus 16 during the above described example, with the speed of transmission being controlled by the host computer 10, acting as a bus master. The time line of FIG. 3b shows those transmitted packets of the time line of FIG. 3a that are responded to with an ACK, and have a status indication recorded in the REQUEST/RESPONSE RECORD register 28. In this example it is assumed that the current control word requires the resource to be available at each SOF.

After a first SOF packet, SOF 1 shown at the left most side of the time line of FIG. 3a, a SETUP packet is received by the REQUEST/RESPONSE logic 24 for RESOURCE 1, and an ACK packet is transmitted in response, as shown next to the SOF 1 indication in the time line of FIG. 3a. The RESOURCE 1 SETUP packet status is stored in the REQUEST/RESPONSE RECORD register 28 by the REQUEST/RESPONSE logic 24, as shown at the left most side of the time line of FIG. 3b. Thereafter, the REQUEST/RESPONSE logic 24 makes RESOURCE 1 unavailable by responding to each subsequent IN packet transaction with a NAK packet transmission, and repeats the NAK packet transmissions until the next SOF packet indication, SOF 2. This is an example of a control word wherein SETUP disarms subsequent IN and OUT transactions.

After the SOF 2 packet shown in the time line of FIG. 3a, the REQUEST/RESPONSE logic 24 makes RESOURCE 1 available again by rearming the resource, and the very next repeated IN transmission is acknowledged with an ACK packet response, as shown in the time line of FIG. 3a after SOF 2. Status of the IN packet is stored in the REQUEST/RESPONSE RECORD register 28, as shown after SOF 2 in the time line of FIG. 3b. Again, for a next IN packet request following the acknowledged IN packet after SOF 2, the REQUEST/RESPONSE logic 24 makes RESOURCE 1 unavailable and responds with NAK packets until SOF 3. This is an example of a control word wherein an IN or OUT transaction disarms subsequent IN or OUT transactions until a reading of a control word from the WORKING register 32 at the next SOF.

At SOF 3, the IN transmission is acknowledged with an ACK, and stored in the REQUEST/RESPONSE RECORD register 28, as shown after SOF 3 in the time line of FIG. 3b. The following OUT transmissions shown in the time line of FIG. 3a are responded to with NAK packets until SOF 4, whereupon an ACK is transmitted to the host computer 10, and the status of the OUT packet is stored in the REQUEST/RESPONSE RECORD register 28, as shown after SOF 4 in the time line of FIG. 3b.

Thus, the time line of FIG. 3a shows an acknowledged packet after each SOF indication, corresponding to the available state for RESOURCE 1, followed by repeated NAK packets, corresponding to the unavailable state for RESOURCE 1, until the next SOF indication. On the other hand, the time line of FIG. 3b shows recorded status for packets SETUP, IN, IN, IN and OUT, spaced by the elapsed time between successive SOF time marks, and in the order received by the REQUEST/RESPONSE logic 24. The toggling of available and unavailable states for any particular ones of the resources 22 is controlled by control words written into the WORKING register 32 by the local intelligent device and provides an ordered status record of bus transactions in the REQUEST/RESPONSE RECORD register 28, as shown in the time line of FIG. 3b. The control words may be of the type discussed above, where, for example, a control word permits arming of a resource and acknowledgment of a SETUP packet, followed by disarming the resource with respect to subsequent IN and OUT transactions, or acknowledgment of an IN or OUT, with disarming of the resource with respect to subsequent IN or OUT transactions.

The toggling of available and unavailable states at each SOF enables the intelligent device 20 sufficient time to process tasks associated with the bus transactions, and changes the mode of the resources at an appropriate time between system cycles. In this manner, a low cost processor can be implemented as the intelligent device 20, and still permit the use of a high performance bus protocol such as the USB protocol.

The above is a detailed description of an exemplary embodiment of the present invention. The full scope of the present invention is set out in the following claims, which define the scope of protection to which the present invention is entitled.

What is claimed is:

1. A method for controlling access to a resource by a bus master over a bus coupling the bus master to the resource, the resource including an intelligent component, comprising the steps of:

transmitting a series of packets over the bus, from the bus master to the resource, at a transmission speed controlled by the bus master;

throttling reception of the packets at the resource, at specified time intervals;

setting each of the time intervals at a time period to assure sufficient time for the intelligent component to complete processing tasks contained in the packets.

2. The method of claim 1, wherein the step of throttling reception of the packets at the resource is carried out by accepting a first one of the series of packets at the beginning of a specified time interval, making the resource unavailable after accepting the first one of the packets, thereafter making the resource available at the beginning of a next specified time interval.

3. The method of claim 2, comprising the further step of selectively transmitting one of an ACK or NAK handshake from the resource to the bus master after reception of each packet, and wherein the step of accepting the first one of the packets is carried out by transmitting an ACK, and the step of making the resource unavailable is carried out by transmitting a NAK.

4. The method of claim 2, comprising the further step of recording status information at the resource for each accepted packet, in order of acceptance.

5. The method of claim 1, wherein the step of setting each of the time intervals is carried out by providing a time frame based protocol causing transmission of a START OF FRAME (SOF) packet from the host to the resource at the beginning of each time frame, and using each SOF at the resource to designate the beginning of each specified time interval.

6. A method of changing the operational mode of components of a computer system, comprising the steps of:

providing a bus to couple the components to one another;

operating the bus with a time frame based protocol causing transmission of a START OF FRAME (SOF) packet at the beginning of each time frame;

changing the operational mode of a selected one of the components upon detection of transmission of a START OF FRAME (SOF) packet.

7. The method of claim 6, wherein the step of changing the mode of a selected one of the components is carried out by changing the availability of the selected one of the components from available to unavailable.

8. The method of claim 6 wherein the step of changing the mode of a selected one of the components is carried out by changing the availability of the selected one of the components from unavailable to available.

9. A resource device, which comprises:

a resource;

a request/response logic coupled to the resource and adapted for coupling to a bus controlled by a bus master, for transmitting packets between the bus master and the resource over the bus;

an intelligent device coupled to the request/response logic to transmit a predetermined control signal to the request/response logic;

the request/response logic being responsive to the control signal to throttle reception of the packets between the resource and the bus master, at specified time intervals.

10. The resource device of claim 9, further comprising a request/response record register coupled to each of the request/response logic and the intelligent device, the request/response logic writing status information relating to throttled packets, to the request/response record register.

11. The resource device of claim 9, wherein the resource device comprises a peripheral device.

12. The resource device of claim 9, further comprising a frame boundary detection logic coupled to the request/response logic and adapted for coupling to the bus for detecting a start of frame signal as an indication of the beginning of each specified time interval.

* * * * *

UNITED STATES PATENT AND TRADEMARK OFFICE
CERTIFICATE OF CORRECTION

PATENT NO. : 6,058,440
DATED : May 2, 2000
INVENTOR(S) : BLOCH et al.

It is certified that error appears in the above-indentified patent and that said Letters Patent is hereby corrected as shown below:

Column 2, line 22    "components" should be --component--

Signed and Sealed this

Seventeenth Day of April, 2001

*Attest:*

NICHOLAS P. GODICI

*Attesting Officer*   Acting Director of the United States Patent and Trademark Office